United States Patent [19]  [11] 4,437,015
Rosenblum  [45] Mar. 13, 1984

[54] METHOD AND APPARATUS FOR AUTOMOBILE ACTUATED POWER GENERATION

[76] Inventor: Jack Rosenblum, 923 West "I" St., Ontario, Calif. 91762

[21] Appl. No.: 362,371

[22] Filed: Mar. 26, 1982

Related U.S. Application Data

[63] Continuation of Ser. No. 111,473, Jan. 11, 1980, abandoned.

[51] Int. Cl.³ ............................................. F04B 35/00
[52] U.S. Cl. .................................... 290/1 R; 417/229
[58] Field of Search ......................... 417/229; 290/1 R

[56] References Cited

U.S. PATENT DOCUMENTS

| | | | |
|---|---|---|---|
| 1,771,200 | 7/1930 | Akers | 417/229 |
| 3,885,163 | 5/1975 | Toberman | 290/1 R |
| 4,239,975 | 12/1980 | Chiapetti | 290/1 R |
| 4,250,395 | 2/1981 | Lundgren | 290/1 R |

*Primary Examiner*—J. V. Truhe
*Assistant Examiner*—Shelley Wade
*Attorney, Agent, or Firm*—Wm. Jacquet Gribble

[57] ABSTRACT

A plurality of cylindrical rollers are embedded in a roadway over which wheeled vehicles move such that the vehicle wheels rotate the contacted rollers. A shaft transverse to the roadway supports the rollers and turns with them to transfer power from vehicle contact to an electrical generating apparatus. Power accumulating apparatus, such as a water or hydraulic fluid reservoir, may intervene between the shaft and the generator to smooth the power flow when vehicle travel is intermittent. Alternate apparatus may directly link the shaft to an electrical generator which may, in turn, charge batteries or pump water upwardly to accumulate power for response to later demand. The rollers may be housed in a metal or concrete trough and cross one or more lanes of traffic to a median power collector such as a spider and bevel gear arrangement that is capable of receiving rotating motion from four right angle directions at once.

In its simplest form, power is taken from auto wheels to turn the rollers and their shaft or shafts, and shaft rotation is communicated directly to an electrical generator to supply demand.

1 Claim, 8 Drawing Figures

METHOD AND APPARATUS FOR AUTOMOBILE ACTUATED POWER GENERATION

BACKGROUND OF THE INVENTION

This is a continuation of application Ser. No. 111,473, filed Jan. 11, 1980 now abandoned.

The invention relates to process and apparatus for transferring power from transient vehicles to a power accumulator for directly or subsequently supplying electricity to a user. While the necessity of cheaper power is well known, and the costs to users remote from conventional suppliers continues to rise, little has been done to provide inexpensive electrical power, especially to remote users. U.S. Pat. No. 3,859,589, issued Jan. 7, 1975 to C. G. Rush teaches power generation by a static vehicle. British Pat. No. 1,332,202 granted Oct. 3, 1973 to A. P. Pedrick teaches the use of articulated ramps to slow auto traffic and derive auxiliary power from the arresting of vehicle progress. Pedrick does not result in a great power gain, however, since the arrested vehicles must consume much energy in accelerating to normal speed after passing through the deceleration area. In contrast, the present invention actuates generating equipment with no appreciable or noticeable dimunition of vehicle speed and little if any subsequent need for power consumption to gain normal velocity.

All of the physical elements of the invention are commercially available and installation of the invention in existing roadways is mechanically and commercially feasible.

STATEMENT OF THE INVENTION

The process of the invention contemplates the steps of placing rollers fixed to a shaft transversely of a roadway for wheeled vehicles, causing the vehicle wheels to impinge the rollers to impart rotational motion to the rollers, transferring the rotational motion to a motion translating device, and linking the translating device to an electrical generator. In one embodiment of the invention the translating device is a bevel and spider gear apparatus which may turn a generator. Another embodiment includes the further steps of using the translating device to accummulate potential energy, as in a fluid reservoir, and later changing potential energy to kinetic energy applied to an electrical generator. A parallel process applies the motion of the shaft to a hydraulic pump which pressurizes a tank for a motor that is applied to an electrical generator.

The apparatus of the invention contemplates a plurality of rollers each fixed to a shaft mounted in a recess in a transverse attitude to a roadway. A plurality of shafts with rollers is so mounted in one or all lanes of a roadway. Preferably a central or median gear assembly receives the transferred power from each plurality of roller shafts. In case of a multiple lane highway, roller shaft pluralities are linked, preferably by a slip clutch device, to obviate torque stresses induced by vehicles of different speeds contacting linked roller sets at the same time.

The gear assembly may drive a hydraulic pump linked with a reservoir and having a hydraulic motor fed from the reservoir. A generator may be turned by the hydraulic motor to generate electric power. Other accummulating means are possible within the scope of the invention, and some of such means will be detailed later.

While the invention may require modification of existing roadways, such modifications are simple and economical and may be accomplished quickly without materially impeding traffic flow. The resultant added power source at little cost or no cost to the community adjacent the installation and at small if any cost to the vehicle operator has the added power saving feature of reducing transmission line power loss, further economizing on power generation. Very few communities are remote from vehicular traffic and some experience very heavy traffic flow from which the community derived no benefit up to the present invention.

These and other advantages of the process and apparatus of the invention are apparent from the following detailed description and drawing, in which:

DESCRIPTION OF THE PREFERRED EMBODIMENTS

Figure 1:
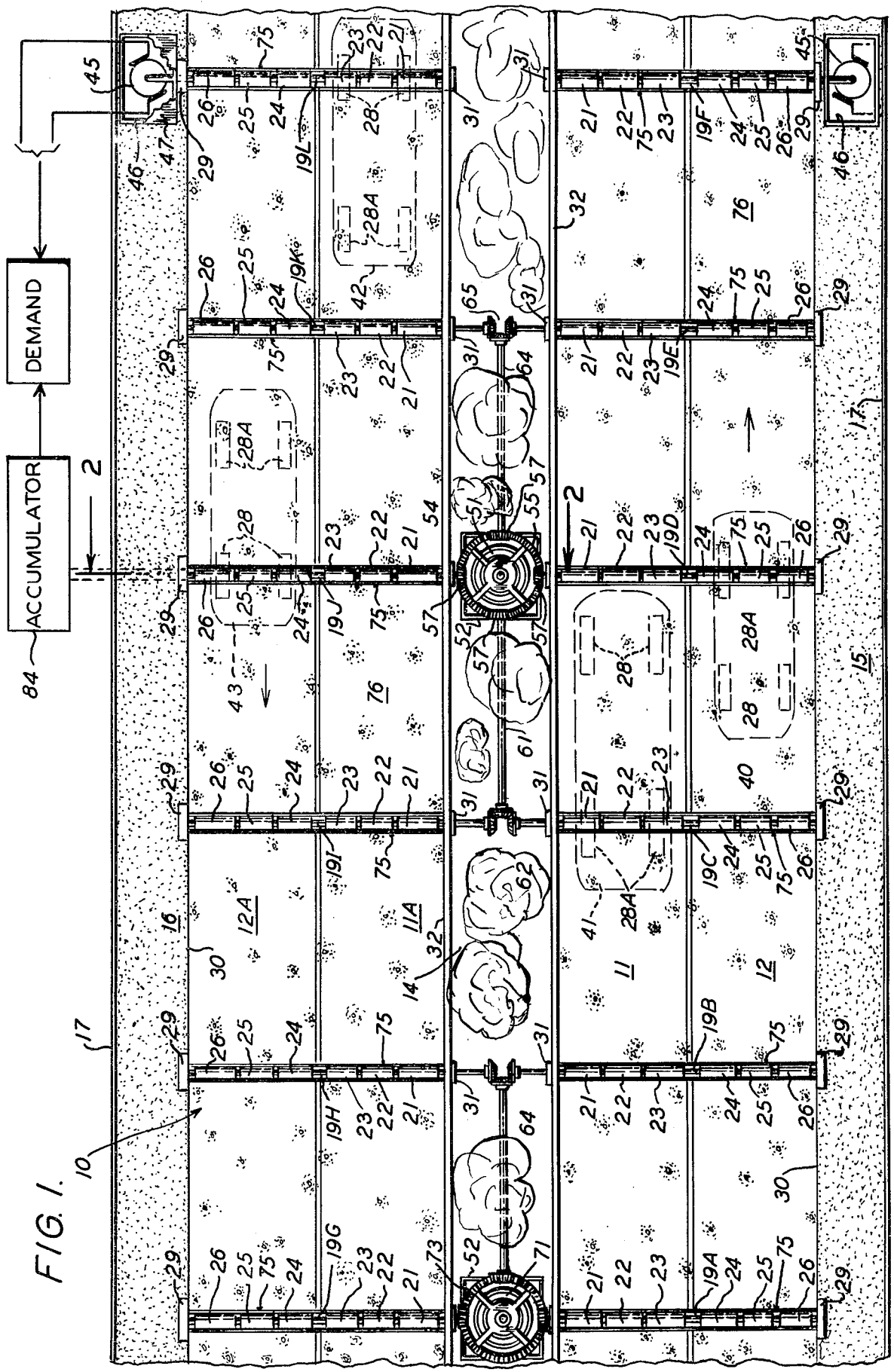
FIG. 1 is a schematic plan view of the apparatus of the invention in place on a roadway.

In the various embodiments like parts are identified by like reference numerals.

The embodiments of FIGS. 1–5 are shown in place on a four lane roadway indicated generally by the numeral 10. The roadway has inner lanes 11 and 11A and outer lanes 12 and 12A, with traffic presumed to travel left to right in lanes 11 and 12 and right to left in lanes 11A and 12A. A median strip 14 between lanes 11, 11A divides the roadway conventionally. Shoulders 15 and 16 on opposite sides of the roadway border lanes 12 and 12A and are themselves edged by fences 17.

Figure 2:
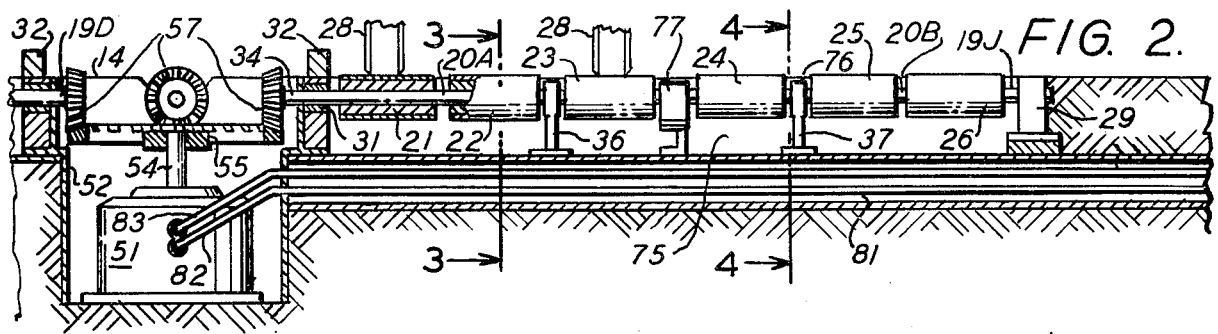
FIG. 2 is a fragmentary sectional elevational view taken along line 2—2 of FIG. 1.
Figure 3:
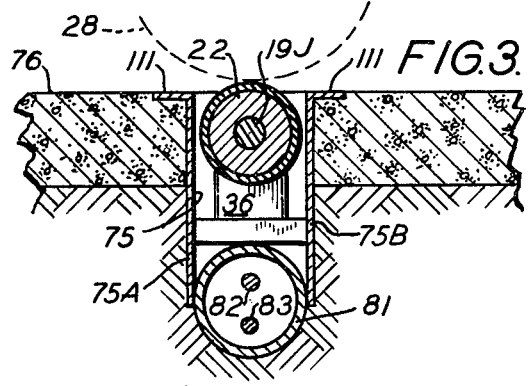
FIG. 3 is a fragmentary sectional elevational view taken along line 3—3 of FIG. 2.
Figure 4:
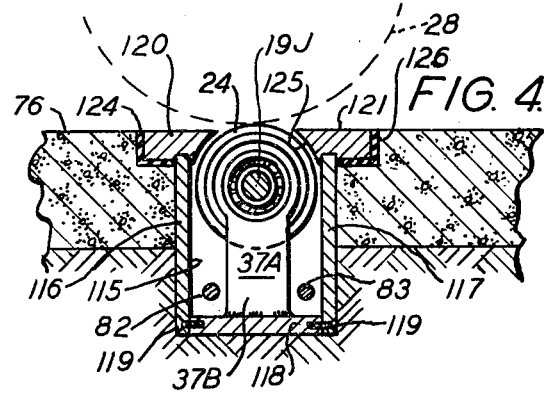
FIG. 4 is a fragmentary sectional elevational view taken along line 4—4 of FIG. 2.

Roller shafts 19 extend transversely of the lanes from the median strip to the shoulders in both directions. Shafts 19A–19F extend across lanes 11, 12 and shafts 19G–19L extend across lanes 11A, 12A. Each shaft portion 20A across an inside lane supports a set of rollers 21, 22 and 23, while each shaft portion 20B across an outer lane supports a set of rollers 24, 25 and 26. Each roller is fixed to its shaft so that rotation imparted to a roller by a vehicle wheel such as the wheels 28 of FIGS. 2–4, is communicated to the shaft. An outer bearing 29 supports one end of each shaft at an edge 30 of the shoulder. An inner bearing 31 at a curbing 32 on each edge of the median strip supports an inner shank 34 of each shaft.

Depending on the shaft material and diameter, intermediate bearings like bearings 36 and 37 shown in FIGS. 2–5 may be used. All bearings are preferably stainless steel to resist weather factors encountered on roadways of every climate.

The roller shafts are spaced along the roadway such that the distance between adjacent roller sets is greater than the average wheelbase of the vehicles on the roadway so that both vehicle axles do not contact rollers at the same time. Representative vehicles 40, 41, 42 and 43 are shown in FIG. 1 in broken lines. Each vehicle has a pair of active wheels 28 and a pair of passive wheels 28A. Rotation is imparted to the contacted rollers by both the active and the passive wheels of each vehicle due to their rotational speed along the roadway. Thus, there is no appreciable difference in power transferred to the roller shaft whether the vehicle has front wheel drive or rear wheel drive. Power benefit is even derived from completely passive vehicles such as semi-trailers and trailers.

In FIG. 1 two embodiments of the invention are perceived in which the power derived from contact of vehicle wheels of passing vehicles with the rollers is accummulated differently. Roller shafts 19F and 19L at the right of the Figure are each directly connected to an electrical generator 45 which supplies power to local demand. Each generator 45 may be located either in the median strip or, as shown, in the shoulder housed in a recessed box 46. The box has cover 47 shown removed or broken away in FIG. 1. The boxes may be equipped with suitable drains and insulated electrically and thermally to protect the generators from inclement weather and from intrusion. The generator units are shown schematically and their capacity and type is determined by the amount of vehicular traffic on the roadway and by the demand the generators purpose to supply.

Roller shafts 19C, 19D and 19E and shafts 19I, 19J and 19K connect with a power translator 51 housed in a recessed box 52 in the median strip 14. A translator shaft 54 is vertically oriented in the box. A spider gear 55 is fixed to shaft 54. Roller shafts 19D and 19J are linked mechanically to the spider gear by bevel gears 57 on the shafts. Roller shafts 19C and 19I connect to the spider gear through a jack shaft 61 by means of a bevel gear set 62. Similarly, roller shafts 19E and 19K connect mechanically to gear 55 by means of a jack shaft 64 and a bevel gear set 65. Thus, power translator 51 of FIG. 1 derives power from three rows of rollers, a total of twelve roller sets. While the sets are shown as comprised of three rollers each, the invention does not preclude single rollers or sets of more than three rollers.

Shafts 19A, 19B and 19G, 19H are part of a similar translator assembly and with a third pair of roller shafts (not shown) transfer rotational power to another power translator 71 with a spider gear 73. Translator 71 is also in a recessed box 52 in the median strip.

Each recessed box 52, like boxes 46, may have a conventional drain system and may be electrically and thermally insulated to protect the equipment in the box.

FIG. 2, a transverse sectional elevational view of the translator assembly of FIG. 1, shows roller sets in a trough 75 of metal. The trough is recessed below the roadway surface 76. Roller shaft 19J is supported in the trough by end bearings 29 and 31. A slip clutch 77 intermediate the two roller sets of the roadway lanes safeguards the two sections 20A, 20B of shaft 19J against torque failure should vehicles such as the vehicles 42, 43 impinge upon the two roller sets at different velocities. Slip clutch 77 therefore compensates for differing rotational moment imparted to the roller shaft by vehicles of different road speed.

Figure 5:
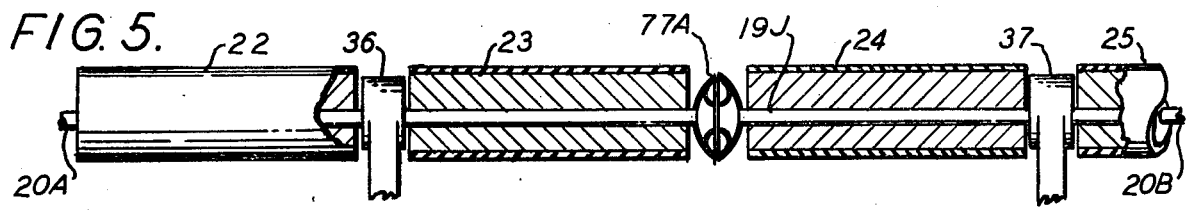
FIG. 5 is a fragmentary, partly schematic sectional view similar to FIG. 2, but to a larger scale.

The slip clutch may be of varying types and, as shown schematically in FIG. 5, may be a fluid coupling 77A. Slip clutches may also be interposed in the transmission linkage between spider gear 55 and the roller shafts, or between the spider gear and the translator to protect each component against the effects of abrupt changes in rotational speed.

As previously set forth above, bearing supports such as the intermediate bearings 36, 37 may be provided at more frequent transverse intervals than shown in the illustrative embodiments, depending upon the metallurgy and diameter of the roller shafts. It may be found advantageous to employ bearing types other than the illustrative roller bearings to further reduce friction and increase efficiency of power transfer. For instance, the invention does not preclude the use of magnetic bearings, with their nearly frictionless operation and lesser maintenance requirements if economically feasible for the particular installation.

A secondary lower trough 81 beneath roller trough 75 is shown in FIG. 3. The secondary trough defines a protective conduit for power transfer lines 82, 83 extending from translator 51 beneath the roadway and the shoulder to a power accumulator 84, which in turn is linked to the local or remote demand or load. Accumulator 84 may differ in type, depending upon the characteristics of power translator 51 to which it is connected by lines 82, 83. In some instances power transfer lines 82, 83 will conduct electricity while in other cases they will conduct hydraulic or other liquid or fluid.

Figure 6:
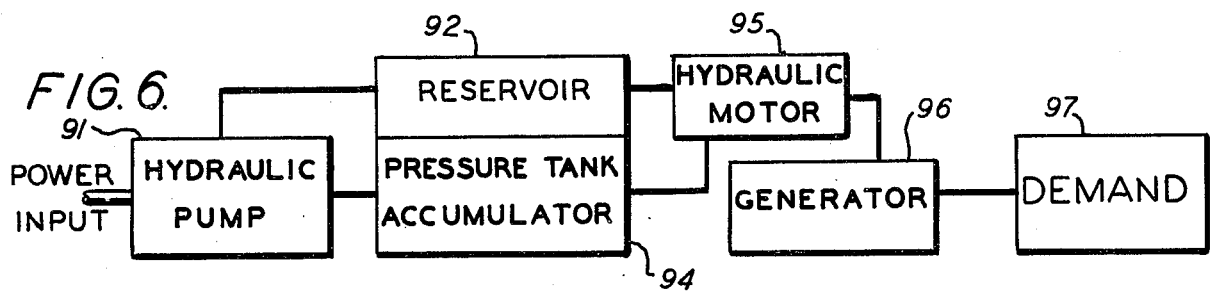
FIG. 6 is a block diagram of an alternate embodiment of the invention employing a hydraulic fluid system.

In the embodiment schematically displayed in FIG. 6, the spider gear may drive a hydraulic pump as a translator, by way of shaft 54, in which case the power transfer lines are hydraulic fluid lines transferring liquid to an accumulator from the hydraulic pump. The pump 91 draws fluid from a reservoir 92, which may be at a point remote from the pump and the roadway. The pump and fluid lines thus become translator means for turning rotational moment to fluid pressure. The pump thereby pressurizes a tank accumulator 94 from which fluid under pressure drives a hydraulic motor 95 at a controllable rate. the hydraulic motor turns an electrical generator 96 which constantly supplies electrical power in accordance with the demand 97 of the system.

Figure 7:
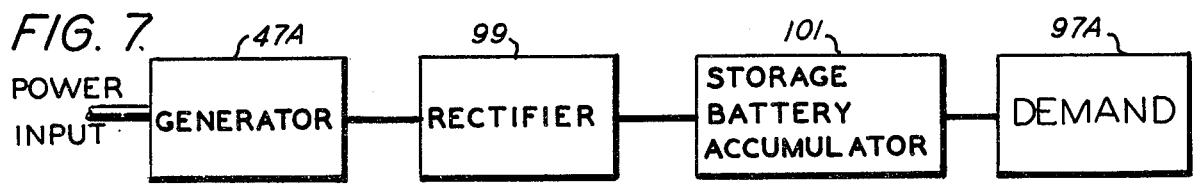
FIG. 7 is a further alternate embodiment of the invention shown diagrammatically.

In the embodiment of FIG. 7 the power input from roller shafts, such as the shafts 19F and 19L, drives an A. C. generator 47A which may be electrically linked to a rectifier 99 which sends current to a storage battery accumulator 101. Accumulator 101 may then respond to the load demand 97A. Obviously a D. C. generator, no rectifier 99 and a battery accumulator 101 may substitute for the A. C. generator and rectifier, if desired.

Figure 8:
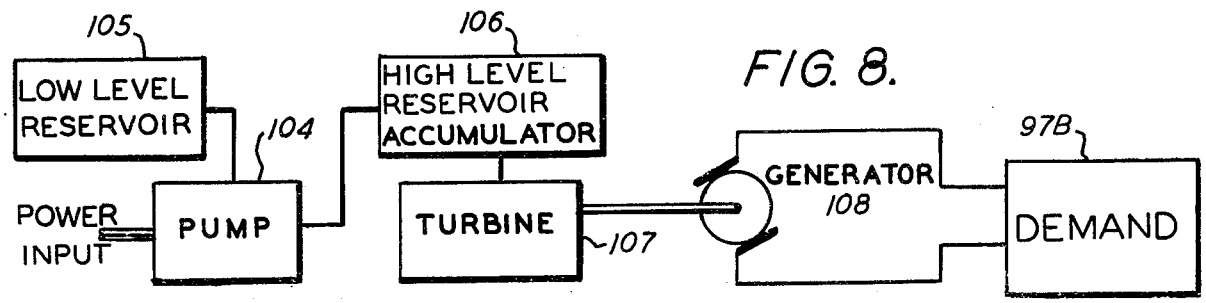
FIG. 8 is a block diagram of a still further alternate embodiment of the invention.

A further alternate embodiment illustrated in FIG. 8 comprises a power translator unit in the configuration of a liquid pump 104 located at the site of translator 51 of FIG. 2. A low level reservoir 105 supplies liquid, such as water or mercury, to the pump which transfers the kinetic energy of the rotating rollers to potential energy by accumulating the supplied liquid in a high level reservoir 106. The high reservoir acts as a power accumulator from which power on demand may be drawn by using the high level liquid to turn a lower level turbine through gravity flow of the liquid. The turbine 107 turns an electrical generator 108 linked to local demand 97B, or to remote demand, as desired.

Each of the schematically illustrated embodiments presents a method for generating power from passing vehicles on a roadway by the steps of locating power transfer means in the path of the wheels of the vehicles and translating the wheel-imparted rotary motion into potential energy and linking the potential energy to an electrical generator to drive the generator. The method of the invention may be accomplished by the apparatus described for illustrative purposes or by other embodiments of the apparatus of the invention.

The illustrated apparatus may be embodied in several devices. For instance, the embodiment of FIGS. 2 and 3 has a roller trough 75 comprised of elongate flanged members 75A, 75B, which extend the width of the roadway from median strip to shoulder. Upper flanges 111 of each flange member are recessed in the concrete upper face 76 of the roadway and each roller, such as the roller 22, is supported by roller shaft bearings 29, 31 so that the upper roller periphery protrudes slightly above roadway surface 76 in postion to contact the wheels of passing vehicles. The protrusion may vary from ¾" to 1½" depending on the average speed of passing vehicles. The higher the speed the less the protrusion.

Secondary trough 81 may be a cylindrical structure like a conventional pipe, and the power transfer lines 82, 83 are shielded therein as they traverse the underside of the roadway.

In FIG. 4 an alternate embodiment of the invention comprises a trough 115 associated with a transverse roadway cut 115A having recessed edges which receive the single trough with its spaced vertical members 116, 117 joined at their bottom transverse edges by an elongate floor plate 118. A plurality of screws 119 secures the plate to the vertical members. Intermediate bearings such as bearing 37A may be welded to the floor plate to fix locations and to support roller shaft 19J, for example. The trough may be assembled and dis-assembled by removing screws 119 while removed from the cut.

Shaped upper closure shields 120, 121 partially seal the trough against road dirt, and may be welded to upper edges of vertical members 116, 117 along the length of the members. In addition to screening the trough from dirt, the shields 120, 121 locate the trough within roadway recess 124 and smooth the transition of vehicle wheels across the trough and its rollers. Shields 120, 121 are co-extensive with the upper surface of the roadway and the rollers, such as roller 24 in FIG. 4, protrude above the shields for contact with vehicle wheels of passing vehicles.

Power transfer lines 82, 83, whether electrical or hydraulic, may be located in the trough on either side of bearing pedestal 37B of the intermediate bearing 37A. The shields are contoured adjacent the rollers in a concave face 125 concentric with the roller periphery. The shields lodge in a sealing and cushioning filler 126 of conventional composition intervening between the shields and the recessed roadway.

The apparatus of the invention may be installed in new roadways concurrently with the pouring of the road surface. In older roads abrasive saws may be used to incise the roadway surface and to form the recessed cut edges. The common presence of expansion joints at regular intervals in the roadways can lower installation costs by use of the joint as one side of the trough cut, eliminating one cut.

Several different types of accumulator and translators have been shown, but the invention does not preclude the use of other devices such as light-weight, high speed flywheels, currently nearing commercial readiness, as reported in the magazine "POPULAR SCIENCE" for October 1979 at page 76.

It will also be noted that while the rollers 21–26 of the illustrative embodiments are solid in form and have exterior resilient sleeves for efficient reception of motion from vehicle wheels, other forms of rollers are not precluded by the invention. Present data indicates textured resilient materials are optimum for power transfer. However, further investigation and experimentation may develop alternative texture patterns and materials other than those disclosed. It is therefore desired that the present disclosure not limit the inventive scope in this area.

While several embodiments of the invention have been shown, both method and apparatus, other modifications other than those shown and described herein may occur to those skilled in this particular art. it is therefore desired that the invention be measured by the appended claims rather than by the foregoing illustrative disclosure.

I claim:

1. Power transfer apparatus for generating power from passing wheeled vehicles on a roadway including at least two separate lanes for vehicles traveling in opposite directions, comprising a plurality of pairs of oppositely disposed parallel roller shafts transverse of each separate lane of said roadway, spaced rollers secured to each oppositely disposed parallel shaft to rotate therewith and adapted to be engaged by and rotated by vehicle wheels of said vehicles in contact therewith on each lane of said roadway, each of said pairs of oppositely disposed parallel shafts being spaced from each other pair of oppositely disposed parallel shafts so that wheels on both ends of said vehicle do not contact rollers on adjacent spaced pairs of shafts at the same time, a bevel gear fixed to oppositely disposed ends of each pair of said roller shafts and rotatable therewith, a spider gear located between said at least two lanes of roadway and positioned to be engaged and driven by bevel gears on one pair of said roller shafts, adjacent pairs of roller shafts positioned on opposite sides of said one pair of said roller shafts and equally spaced therefrom, a jack shaft having a bevel gear on each end thereof, said jack shaft engaging said bevel gears of each pair of roller shafts on opposite sides of said one pair of roller shaft and said spider gear thereby driving said spider gear, a translator means, said spider gear being connected to said translator means via a translator shaft, a power accumulator means operatively linked to said translator means, and further means linking said accumulator means to a power demand.

* * * * *